US012351087B2

(12) United States Patent
Zhang

(10) Patent No.: US 12,351,087 B2
(45) Date of Patent: Jul. 8, 2025

(54) TELESCOPIC ADJUSTMENT STRUCTURE

(71) Applicant: BAMBINO PREZIOSO SWITZERLAND AG, Steinhausen (CH)

(72) Inventor: Daliang Zhang, Steinhausen (CH)

(73) Assignee: BAMBINO PREZIOSO SWITZERLAND AG, Steinhausen (CH)

(*) Notice: Subject to any disclaimer, the term of this patent is extended or adjusted under 35 U.S.C. 154(b) by 91 days.

(21) Appl. No.: 18/249,121

(22) PCT Filed: Oct. 13, 2021

(86) PCT No.: PCT/IB2021/059394
§ 371 (c)(1),
(2) Date: Apr. 14, 2023

(87) PCT Pub. No.: WO2022/079627
PCT Pub. Date: Apr. 21, 2022

(65) Prior Publication Data
US 2023/0391236 A1     Dec. 7, 2023

(30) Foreign Application Priority Data

Oct. 14, 2020   (CN) .......................... 202011097141.1

(51) Int. Cl.
*B60N 2/28*     (2006.01)
(52) U.S. Cl.
CPC ......... *B60N 2/2887* (2013.01); *B60N 2/2821* (2013.01)
(58) Field of Classification Search
CPC .................................................. B60N 2/2887
See application file for complete search history.

(56) References Cited

U.S. PATENT DOCUMENTS

2013/0026804 A1   1/2013   Guo
2018/0251051 A1   9/2018   Anderson et al.

FOREIGN PATENT DOCUMENTS

CN    102897062 A    1/2013
CN    102991381 A    3/2013
(Continued)

OTHER PUBLICATIONS

Chinese Application No. 11120896140; Chinese Office Action dated Sep. 13, 2022; 10 pages.
(Continued)

*Primary Examiner* — Timothy J Brindley
(74) *Attorney, Agent, or Firm* — CANTOR COLBURN LLP

(57) ABSTRACT

The disclosure provides a telescopic adjustment structure including a fixing device movably arranged on a base and a locking member movably arranged on the base and capable of locking the fixing device, a plurality of positioning parts cooperating with the locking member are arranged on the fixing device, and the fixing device is locked to different corresponding positions corresponding to the base by the locking member in locked cooperating with different positioning parts, or the fixing device is movable corresponding to the base by the locking member separated from the positioning parts. In the telescopic adjustment structure of the disclosure, the locking member and the fixing device are locked or unlocked by movement of the locking member, such that the fixing device may be adjusted in length in respect to the base with simple structure and more convenient installation.

18 Claims, 7 Drawing Sheets

(56) References Cited

FOREIGN PATENT DOCUMENTS

| | | | | |
|---|---|---|---|---|
| CN | 203211133 | U | | 9/2013 |
| CN | 104859495 | A | | 8/2015 |
| CN | 105270217 | A | | 1/2016 |
| CN | 205706275 | U | | 11/2016 |
| CN | 106965717 | A | | 7/2017 |
| CN | 107199923 | A | * | 9/2017 ........... B60N 2/2821 |
| CN | 108237956 | A | * | 7/2018 |
| CN | 109305074 | A | | 2/2019 |
| CN | 111483362 | A | | 8/2020 |
| CN | 111516563 | A | | 8/2020 |
| CN | 211166550 | U | | 8/2020 |
| CN | 114906024 | A | * | 8/2022 ........... B60N 2/2827 |
| CN | 115891785 | A | * | 4/2023 ............ B60N 2/286 |
| CN | 109305074 | B | * | 10/2023 ........... B60N 2/2887 |
| EP | 2865562 | A2 | | 4/2015 |
| GB | 2523461 | A | | 8/2015 |
| TW | 201213173 | A | | 4/2012 |
| WO | 2005068247 | A2 | | 7/2005 |
| WO | 2008059036 | A1 | | 5/2008 |
| WO | 2019019502 | A1 | | 1/2019 |
| WO | 2021098710 | A1 | | 5/2021 |
| WO | WO-2023002010 | A1 | * | 1/2023 ........... B60N 2/2821 |
| WO | WO-2023025908 | A1 | * | 3/2023 ........... B60N 2/2821 |

OTHER PUBLICATIONS

International Search Report for International Application No. PCT/IB2021/059394; International Filing Date: Oct. 13, 2021; Date of Mailing: Jan. 21, 2022; 3 pages.

Written Opinion for International Application No. PCT/IB2021/059394; International Filing Date: Oct. 13, 2021; Date of Mailing: Jan. 21, 2022; 5 pages.

Chinese Application No. 2020110971411; Office Action with English mailed Nov. 16, 2023; 21 pages.

Chinese Application No. 2025101301894; Notice of Allowance dated Nov. 29, 2024; 14 pages.

* cited by examiner

TELESCOPIC ADJUSTMENT STRUCTURE

CROSS-REFERENCE TO RELATED APPLICATIONS

This application is a National Stage application of PCT/IB2021/059394, filed Oct. 13, 2021, which claims the benefit of Chinese Application No. 202011097141.1, filed Oct. 14, 2020, both of which are incorporated by reference in their entirety herein.

TECHNICAL FIELD

The disclosure relates to baby products, and particularly to a telescopic adjustment structure.

BACKGROUND

As people pay more attention to safety issues, more and more cars have isofix interfaces installed thereon, so as to perform corresponding installation with safety seats more conveniently and quickly.

SUMMARY

The disclosure provides a telescopic adjustment structure comprising a fixing device movably arranged on the base, comprising a plurality of positioning parts; and a locking member movably arranged on the base and capable of locking the fixing device, wherein the fixing device is locked to different corresponding positions of the base by the locking member cooperating with different positioning parts, or the fixing device is movable relative to the base by the locking member separated from the positioning parts.

The disclosure provides a child safety carrier including a carrier body for carrying children and a base connected to the carrier body, and the is provided with the above-mentioned telescopic adjustment structure.

DETAILED DESCRIPTION

Figure 1:
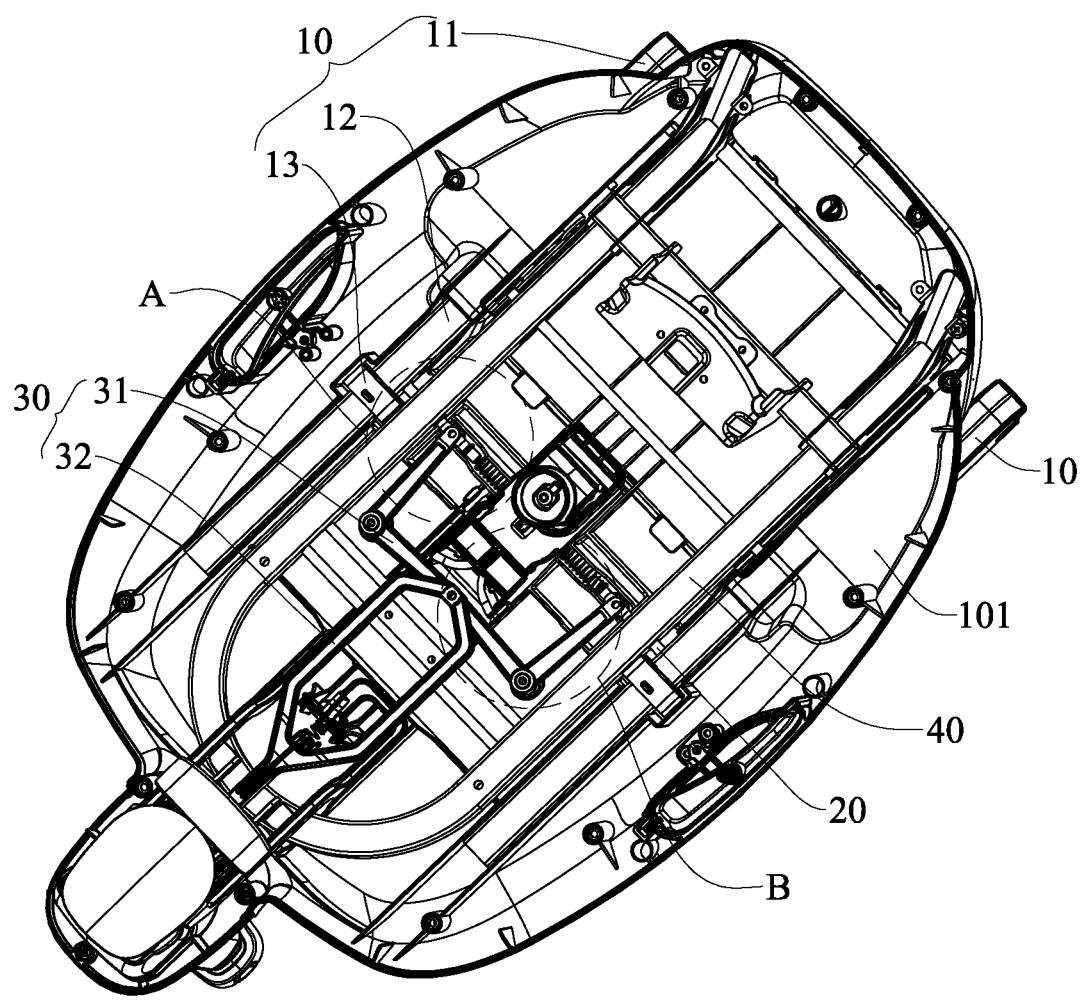
FIG. 1 is a schematic structural view of a telescopic adjustment structure provided by an embodiment of the disclosure.

In order to describe the technical content and structural features of the disclosure in detail, the following illustration is provided conjunction with the embodiments and the accompanying drawings.

Please refer to FIGS. 1 to 7, the disclosure provides a child safety carrier (not shown) including a carrier body for carrying a child and a base 1000 connected to the carrier body. The carrier body is detachably mounted on the base 1000. Specifically, a telescopic adjustment structure 100 is arranged on the base 1000. The telescopic adjustment structure 100 is arranged inside a housing 101 of the base 1000.

The telescopic adjustment structure 100 includes a fixing device 10 located on the base 1000 and a locking member 20 lockable with the fixing device 10. The fixing device 10 is slidably arranged in the housing 101 and is partially protruding out of the housing 101. A plurality of positioning parts 121 cooperating with the locking member 20 are arranged on the fixing device 10, and the locking member 20 is movably arranged on the base 1000. By moving of the locking member 20, the locking member 20 is locked with different positioning parts 121 on the fixing device 10, such that the fixing device 10 is locked at different positions of the base 1000. Or by moving of the locking member 20, the locking member 20 is separated from the positioning parts 121 or unlocked with the positioning parts 121, such that the fixing device 10 may move corresponding to the base 1000, i.e., the fixing device 10 may be telescopically adjusted in respect to the base 1000, thereby a length of a portion of the fixing device 10 protruding out of the housing 101 may be adjusted, such that the base 1000 may be better installed with the car seat.

After adopting the above technical solution, the child safety carrier of the disclosure includes a carrier body and a base 1000, and a telescopic adjustment structure 100 is arranged on the base 1000, such that the fixing device 10 for cooperating with the car's isofix interface(s) may be telescopically adjusted. The fixing device 10 is an isofix joint cooperating with the isofix interfaces. The fixing device 10 may be telescopically adjusted, such that the fixing device 10 may better cooperate with the car's isofix interface, in order to adjust the length of the fixing device 10, such that the installation of the child safety carrier may be more convenient. The telescopic adjustment structure 100 of the disclosure is arranged on the base 1000 for telescopically adjusting the length of the fixing device 10 protruding out of the housing 101, such that the fixing device 10 may better cooperate with the car's seat, so its installation may be performed more conveniently. The telescopic adjustment structure 100 includes a fixing device 10 and a locking member 20 on the base 1000. A plurality of positioning parts 121 which cooperate with the locking member 20 are arranged on the fixing device 10. A movement of the locking member 20 may cause it to be locked to or unlocked from the fixing device 10. A plurality of positioning parts 121 are arranged on the fixing device 10, and when the locking member 20 is separated from the positioning parts 121, the fixing device 10 may be telescopically adjusted in respect to the base 1000, such that length of the fixing device 10 protruding out of the housing 101 may be adjusted and changed according to actual needs. When the fixing device 10 is adjusted to a proper position, the locking member 20 moves to cooperate with the corresponding one of the positioning parts 121 on the fixing device 10, so as to lock the fixing device 10. In the telescopic adjustment structure 100 of the disclosure, the locking member 20 and the fixing device 10 are locked to or unlocked from each other by the movement of the locking member 20, so in unlocked state, the protruding length of the fixing device 10 may be adjusted, i.e., the fixing device 10 may be adjusted in length in respect to the base 1000; moreover, in locked state, the fixing device 10 is fixed to the base 1000, such structure is simple and its installation is more convenient.

Figure 2:
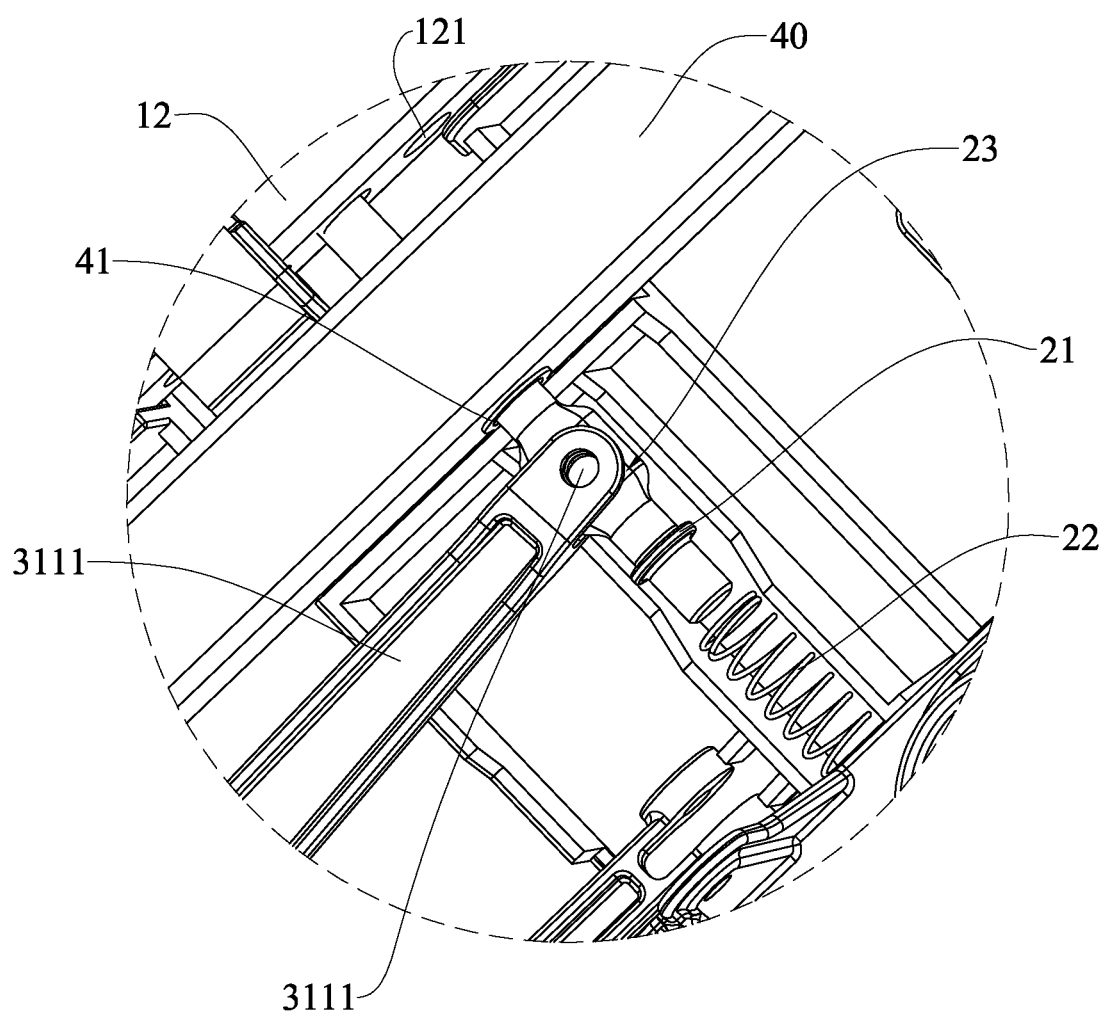
FIG. 2 is an enlarged view of A in FIG. 1.
Figure 3:
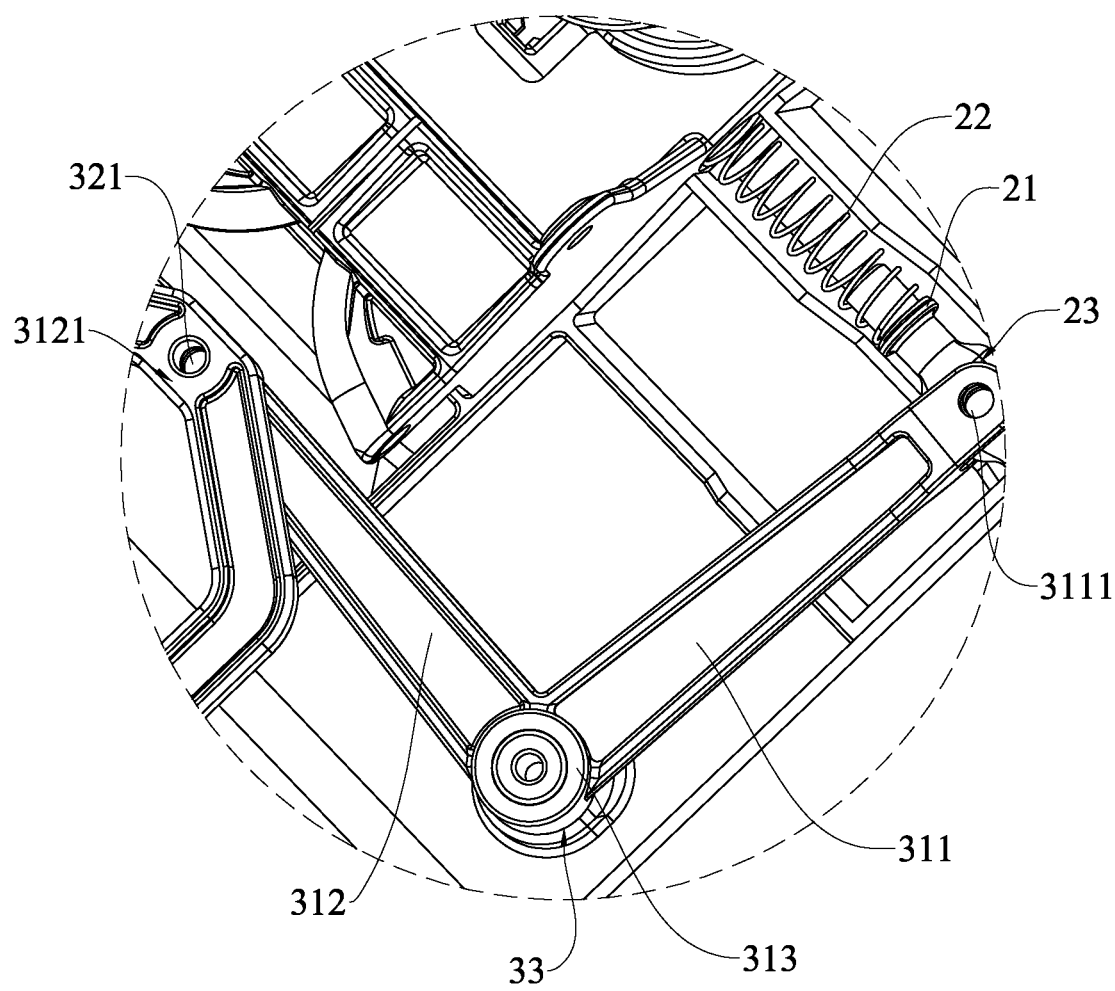
FIG. 3 is an enlarged view of B in FIG. 1.

Please refer to FIGS. 1 to 3, in some optional embodiments, the fixing device 10 includes a fixing part 11 protruding out of the base 1000 and a connecting part 12 located in the base 1000. The positioning parts 121 are arranged on the connecting part 12, and the number of the positioning parts 121 is at least two, so as to ensure that the fixing part 11 may be telescopically adjusted in at least two positions. Specifically, the length of the fixing part 11 protruding out of the base 1000 is adjusted by locking the locking member 20 to different positioning parts 121, in other words, by locking the locking member 20 to different positioning parts 121 on the connecting part 12, the length of the fixing part 11 protruding out of the base 1000 may be adjusted, such structure is simple and related operations are convenient. The positioning parts 121 and the locking member 20 may be locked and unlocked by means of engagement or the like. In this embodiment, the positioning parts 121 each may be a positioning hole or a positioning slot opened upward. The locking member 20 is locked when extending into the positioning hole or the positioning slot, and the locking member 20 is unlocked when separating from the positioning hole or the positioning slot, such structure is simple and related operations are convenient. When the driving member 31 is moving in a direction parallel to the base 100, the locking member 20 cooperates with the positioning hole. When the driving member 31 is moving in a direction perpendicular to the base 1000, the locking member 20 cooperates with the positioning slot opened upward. The fixing part 11 and the connecting part 12 may be formed into an integral structure, and such integral structure is more stable. When the fixing part 11 and the connecting part 12 are integrated, that is, one end of the fixing part 11 is protruding out of the housing 101 of the base 1000, and the other end of the fixing part 11 is located in the housing 101, the length of the fixing part 11 protruding out of the housing 101 may be adjusted by a telescopic sliding of the fixing part 11. Of course, the fixing part 11 and the connecting part 12 may also be in a separate structure, with the fixing part 11 mounted on the connecting part 12, and the fixing part 11 may bring the connecting part 12 to telescopically slid along the housing 101 to perform an adjustment. It should be understood, the fixing part 11 is the isofix joint cooperating with the car's isofix interface.

Figure 5:
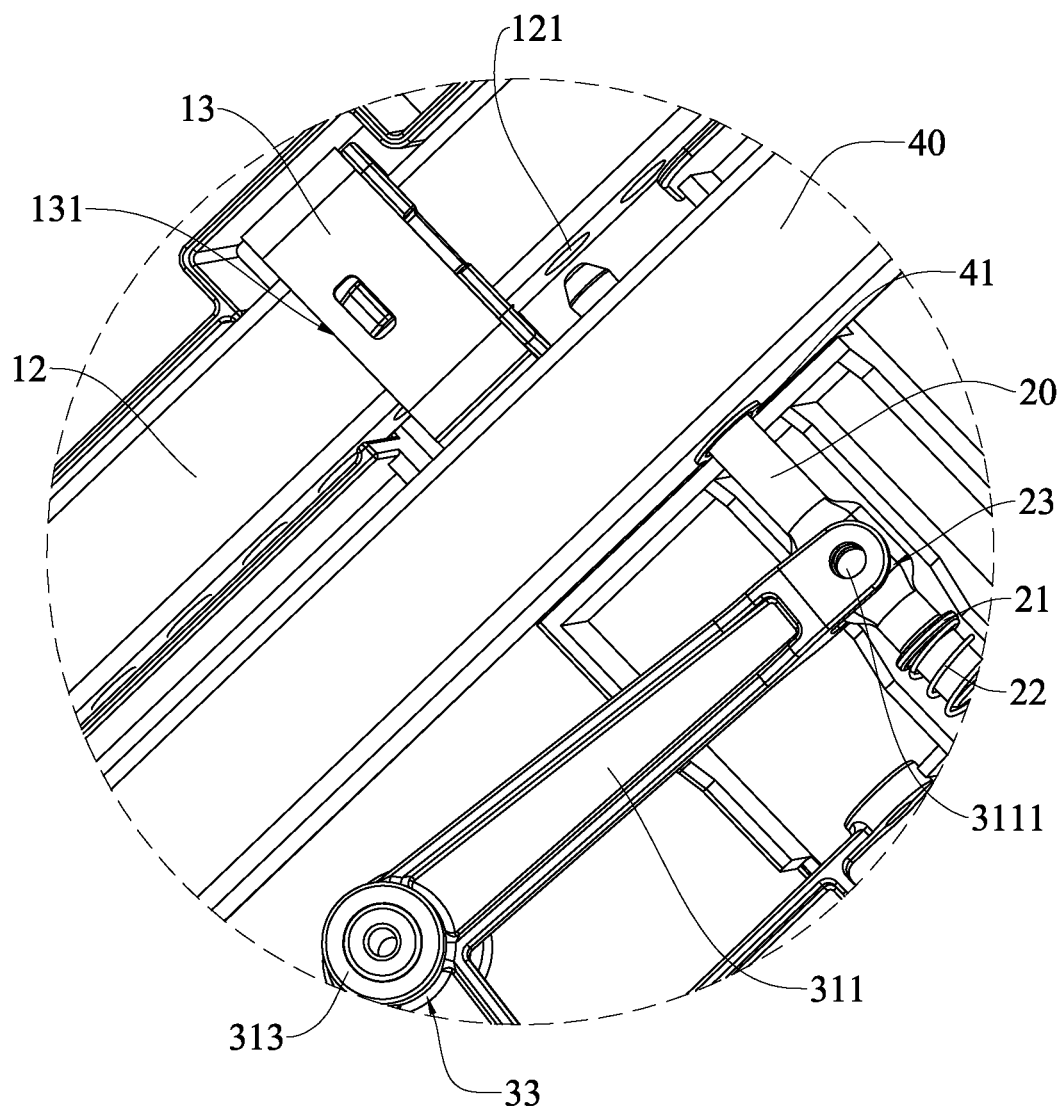
FIG. 5 is an enlarged view of C in FIG. 4.
Figure 6:
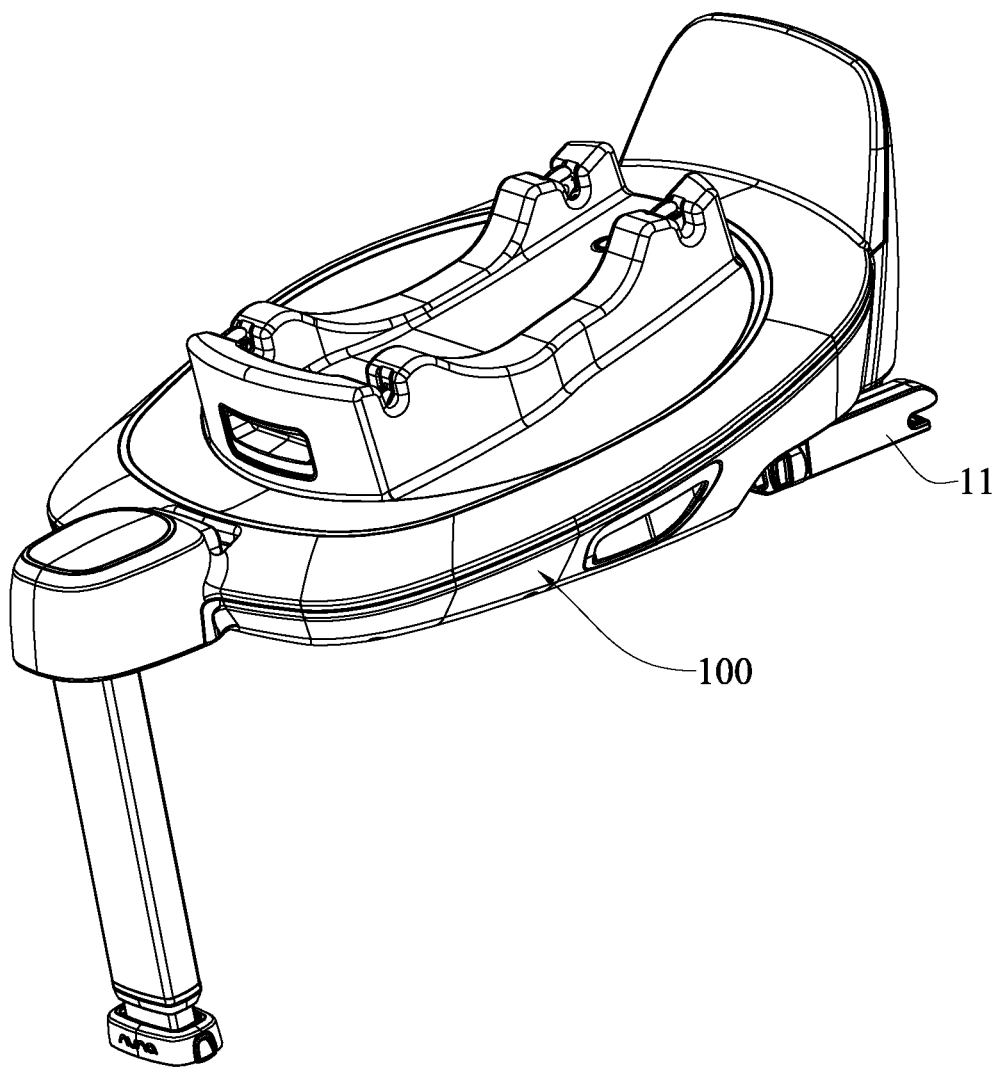
FIG. 6 is a schematic structural view of a base provided by an embodiment of the disclosure.
Figure 7:
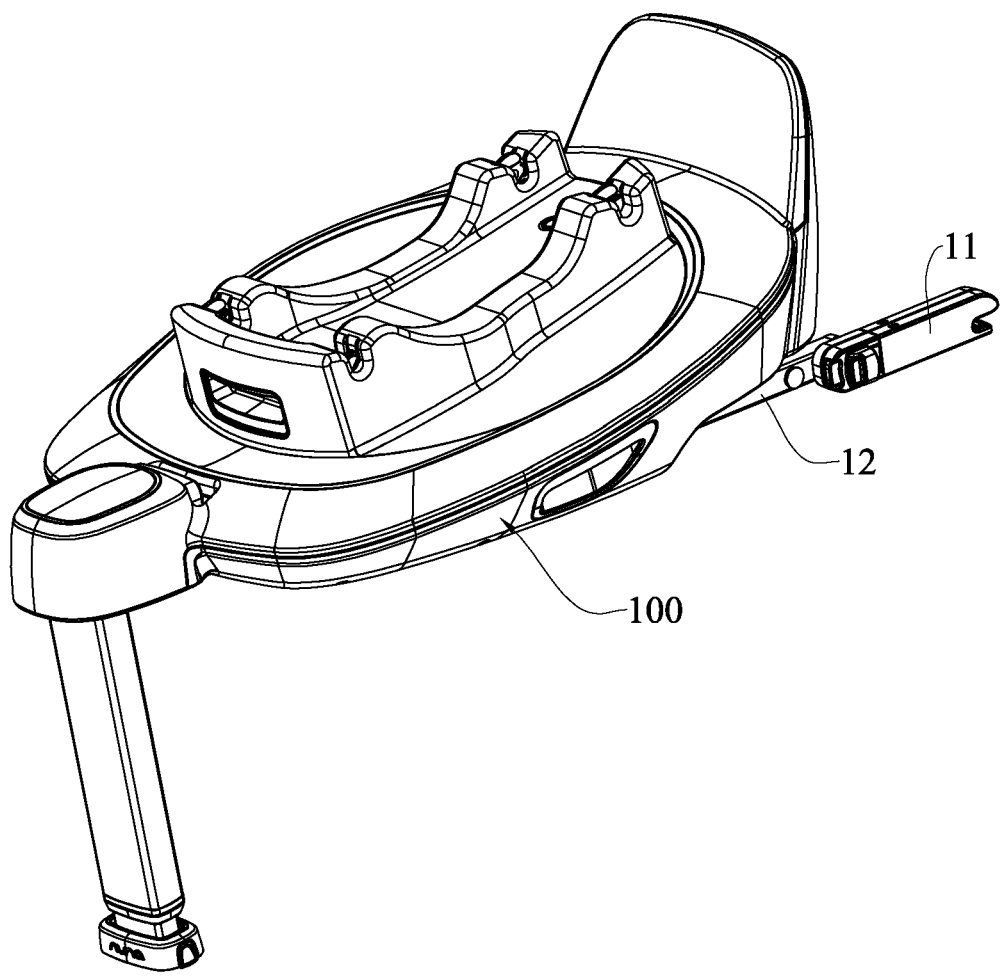
FIG. 7 is a schematic structural view of the base in FIG. 6 in another state.

Please refer to FIGS. 1 and 5, in some optional embodiments, the fixing device 10 further includes a guiding member 13, and the guiding member 13 is provided with a guiding hole 131 for the connecting part 12 to pass through. The connecting part 12 slides along the guiding hole 131 to adjust the length of the fixing part 11 protruding out of the base 1000. Since the fixing device 10 is provided with the guiding member 13, and the connecting part 12 is arranged to pass through the guiding hole 131 of the guiding member 13, so that the connecting part 12 may not slide deviating from the track, and the overall structure is more stable. In this embodiment, the connecting part 12 may also be provided with a limiting part, and the housing 101 or other components is provided with a corresponding part cooperating with the limiting part, so as to prevent the entire connecting part 12 from sliding out of the housing 101.

Please refer to FIGS. 1 to 5, in some optional embodiments, the locking member 20 is arranged elastically stretchable on the base 1000. The locking member 20 is elastically stretchable, so can be better locked and unlocked with the positioning parts 121. Specifically, an elastic member 22 is arranged on the locking member 20, and the elastic member 22 constantly has a tendency to lock the locking member 20 to the fixing device 10; that is, the elastic member 22 may bring the locking member 20 to telescopically slid, such that the locking member 20 always has a tendency to lock with the positioning hole. The locking member 20 is provided with an engaging part 21 for fixing the elastic member 22. One end of the elastic member 22 is arranged on the engaging part 21, and the other one end of the elastic member 22 is fixed to the base 1000. The locking member 20 is connected to the elastic member 22 via the engaging part 21, and the locking member 20 is mounted on the base 1000 via the elastic member 22. Exemplarily, the elastic member 22 is in a spring structure, and the spring structure has a certain telescopic function, which can bring the locking member 20 to reset with a simple structure.

Figure 4:
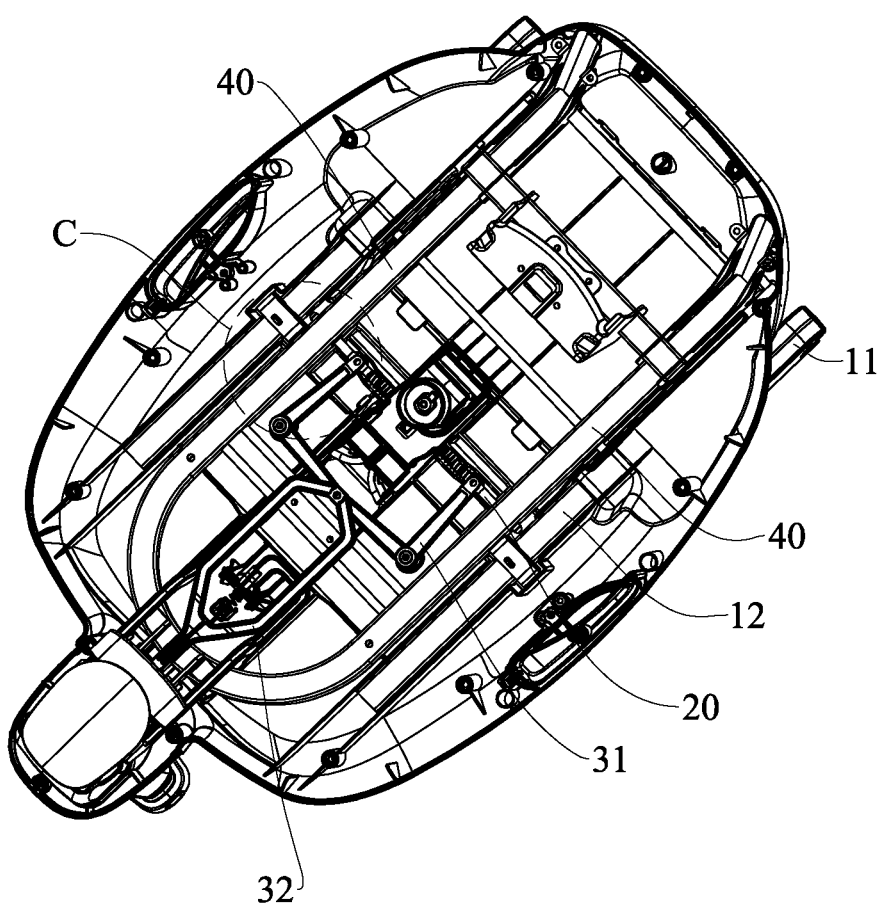
FIG. 4 is a schematic structural view of the telescopic adjustment structure in FIG. 1 in another state.

Please refer to FIGS. 1, 2 and 4, in some optional embodiments, the base 1000 is further provided with a mounting frame 40 for fixing, and the driving assembly 30 may be mounted on the mounting frame 40. Specifically, the mounting frame 40 is arranged on a side of the fixing device 10 close to the locking member 20, and a limiting hole 41 is arranged on the mounting frame 40. The locking member 20 passes through the limiting hole 41 to be locked to or unlocked from the positioning parts 121. Since the mounting frame 40 is provided with the limiting hole 41, the moving direction of the locking member 20 will not deviate, so as to ensure the locking member 20 can be moved in order to be locked to or unlocked from the positioning parts 121 with a more reliable and stable structure. It should be understood, in this embodiment, both ends of the base 1000 are provided with a fixing device 10, and each fixing device 10 is provided with a corresponding locking member 20, with the driving assembly 30 and the mounting frame 40 arranged between the two fixing devices 10, so as to simultaneously drive the two locking members 20 to be locked or unlocked with a simple structure and a reasonable design. Of course, positions and numbers of the fixing device 10, the locking member 20, the driving assembly 30 and the mounting frame 40 are not limited to the above, as long as the movement of the driving assembly 30 can make the locking member 20 and the fixing device 10 are locked to or unlocked from each other, so that the length of the fixing part 11 may be adjusted to better cooperate with the isofix interfaces on the car's seat.

Please refer to FIGS. 1 to 5, in some optional embodiments, the driving assembly 30 is arranged on the base 1000 for driving the locking member 20. One end of the driving assembly 30 is connected to the locking member 20, and the other end of the driving assembly 30 is arranged on the other side of the base 1000 in respect to the position where the fixing device 10 is arranged, that is, the other end of the driving assembly 30 is protruding out of the base 1000, by driving of the driving assembly 30, the locking member 20 slides away from the positioning parts 121 and is unlocked. By driving the portion of the driving assembly 30 protruding out of the base 1000, the driving assembly 30 may bring the locking member 20 to telescopically slide, such that the locking member 20 is separated from the positioning parts 121 to be unlocked with a convenient operation. Specifically, the driving assembly 30 includes a releasing handle 32 and a rotatable driving member 31. The driving member 31 is connected respectively to the locking member 20 and the releasing handle 32. The releasing handle 32 has one end connected to the driving member 31, and the other one end protruding out of the base 1000 for the user to operate. By operating the other one end of the releasing handle 32 for the user to operate, the driving member 31 may bring the locking member 20 to separate from the positioning parts 121 to be unlocked. It should be understood, by the releasing handle 32 protruding out of the base 1000, operation may be performed more easily. The driving member 31 rotates under the action of the releasing handle 32, to convert the force in the vertical direction into the horizontal direction. Under the rotation of the driving member 31, the locking member 20 may be telescopically moved in the horizontal direction with the rotation of the driving member 31, such that the locking member 20 may be separated from the positioning parts 121 to be unlocked. In this embodiment, the releasing handle 32 may also be provided with a resetting member which make the releasing handle 32 constantly have a reset tendency. After the releasing handle 32 is pulled to drive the locking member 20, the resetting member may bring the releasing handle 32 to reset, moreover, the elastic member 22 on the locking member 20 may also bring the locking member 20 to reset, so under the actions of the resetting member and the elastic member 22, the locking member 20 and the positioning parts 121 may be locked. The resetting member may be in a spring structure, and the spring structure has a certain telescopic function, which can bring the locking member 20 to reset with a simple structure.

Please refer to FIGS. 1 to 5, in some optional embodiments, the driving member 31 includes a first connecting block 311 and a second connecting block 312 linked to each other, and a rotating part 313 for connecting the first connecting block 311 and the second connecting block 312. An end of the first connecting block 311 away from the rotating part 313 is connected to the locking member 20, and an end of the second connecting block 312 away from the rotating part 3133 is connected to the releasing handle 32, moreover, the rotating part 313 is fixed to the base 1000 via a mounting member 33. The first connecting block 311 and the second connecting block 312 are rotatably arranged on the mounting member 33 by the rotating part 313. It should be understood, the driving member 31 includes a first connecting block 311 and a second connecting block 312 which rotate around the rotating part 313, and the first connecting block 311 and the second connecting block 312 are linked, moreover, the first connecting block 311 is connected to the locking member 20, and the second connecting block 312 is connected to the releasing handle 32, so that by operating the releasing handle 32, the second connecting block 312 may bring the first connecting block 311 to rotate, thereby moving the locking member 20 to be unlocked. Specifically, the first connecting block 311, the second connecting block 312 and the rotating part 313 may be in an integrally arranged structure, such integrally arranged structure e is more stable, and the operation is more convenient. Of course, the first connecting block 311 and the second connecting block 312 may also be connected to the rotating part 313, as long as the second connecting block 312 in moving can bring the first connecting block 311 to move. In addition, the entire driving member 31 may be in an L-shaped structure, and the L-shaped driving member 31 has a better effect of driving by rotating.

Please refer to FIGS. 1 to 5, in some optional embodiments, the rotating part 313 may be provided with a through hole for the mounting member 33 to pass through, and the mounting member 33 is pivotally fixed on the base 1000 by being mounted in the through hole. Exemplarily, the mounting member 33 may pivotally fix the driving member 31 on the base 1000 in a direction perpendicular to the base 1000. At this time, the plane where the moving direction of the driving member 31 is located is substantially parallel to the plane where the base 1000 is located. And, the included angle between the plane extending substantially parallel to the moving direction of the driving member 31 and the plane where the base 1000 is located is 0°, ±10°, ±25°, and any suitable angle between 0° to ±25°. On the other hand, the mounting member 33 may pivotally fix the driving member 31 on the base 1000 in a direction parallel to the base 1000. At this time, the plane where the moving direction of the driving member 31 is located is substantially perpendicular to the plane where the base 1000 is located. And, the included angle between the plane extending substantially perpendicular to the moving direction of the driving member 31 and the plane where the base 1000 is locate is 75°, 85°, 90°, 115°, and any suitable angle between 75° to 115°.

Please refer to FIGS. 1 to 3 and FIG. 5, in some optional embodiments, a first mounting part 23 is arranged on the locking member 20, and a second mounting part 3111 cooperating with the first mounting part 23 is arranged on the first connecting block 311. The driving member 31 is connected to the locking member 20 via the first mounting part 23 and the second mounting part 3111. The first mounting part 23 and the second mounting part 3111 are provided to better connect the locking member 20 and the driving member 31. Exemplarily, the first mounting part 23 and the second mounting part 3111 may both be threaded holes, which are then fixed by screws. On the other hand, a first connecting hole 3121 is arranged on the second connecting block 312, and a second connecting hole 321 is arranged on the releasing handle 32. The first connecting hole 3121 and the second connecting hole 321 cooperate with screws or other components, so as to connect the second connecting block 312 to the releasing handle 32.

As shown in FIGS. 1 to 7, the child safety carrier of the disclosure includes a carrier body and a base 1000. A telescopic adjustment structure 100 is arranged on the base 1000, such that a fixing device 10 for cooperating with car isofix interfaces may be telescopically adjusted. The fixing part 11 of the fixing device 10 for cooperating with isofix interface is isofix joint. The fixing device 10 may be telescopically adjusted, such that the fixing device 10 may better cooperate with the car's isofix interface, so as to adjust the length of the fixing device 10 according to actual needs, so that the installation of the child safety carrier is more convenient. The telescopic adjustment structure 100 of the disclosure is arranged on the base 1000 for telescopically adjusting the protruding length of the fixing device 10, so that the fixing device 10 may better cooperate with the car's seat for easier installation. The telescopic adjustment structure 100 includes a fixing device 10 on the base 1000 and a locking member 20. The fixing device 10 is provided with a plurality of positioning parts 121 cooperating with the locking member 20. The locking member 20 may be locked to or unlocked from the fixing device 10 by moving. Since a plurality of positioning parts 121 are arranged on the fixing device 10, when the locking member 20 is separated from the positioning parts 121, the fixing device 10 may be telescopically adjusted in respect to the base 1000, such that the length of the fixing device 10 protruding out of the base 1000 may be adjusted and changed according to actual needs. When the fixing device 10 is adjusted to a proper position, the locking member 20 moves to cooperate with a corresponding positioning parts 121 on the fixing device 10, so as to lock the fixing device 10. The movement of the locking member 20 is driven by a driving assembly 30. The driving assembly 30 includes a driving member 31 connected to the locking member 20 and a releasing handle 32 protruding out of the base 1000. The driving member 31 is rotatably arranged on the base 1000. The driving member 31 is brought to rotate by the releasing handle 32, such that the locking member 20 slides to be unlocked. Moreover, the releasing handle 32 is provided with a resettable resetting member, and the locking member 20 is provided with a resettable elastic member 22. When the force acting on the releasing handle 32 is removed, the driving assembly 30 and the locking member 20 may be reset by the resetting member and the elastic member 22, such that the locking member 20 is locked to the positioning parts 121. In the telescopic adjustment structure 100 of the disclosure, the locking member 20 and the fixing device 10 are locked or unlocked by moving of the locking member 20, the length of the fixing device 10 being unlocked in respect to the base 1000 is adjustable, and the fixing device 10 being locked is fixed to the base 1000. Since the length of the fixing part 11 in respect to the base 1000 is adjustable, the installation of the child safety carrier of the disclosure with the seat is more convenient.

The telescopic adjustment structure of the disclosure is movably arranged on the base for telescopically adjusting the length of the fixing device protruding, such that the fixing device may better cooperate with the car's seat, to facilitating installation. The telescopic adjustment structure comprises a fixing device and a locking member on the base. The fixing device is provided with a plurality of positioning parts which cooperate with the locking member, and the movement of the locking member may be locked or unlocked with the fixing device. The fixing device is provided with a plurality of positioning parts, when the locking member is separated from the positioning parts, the fixing device may be telescopically adjusted in respect to the base, such that the length of the fixing device protruding out of the base can be adjusted and changed according to actual needs. When the fixing device is adjusted to a proper position, the locking member moves to cooperate with the corresponding positioning parts on the fixing device, so as to lock the fixing device. In the telescopic adjustment structure of the disclosure, the locking member and the fixing device are locked or unlocked by movement of the locking member, such that the fixing device may be adjusted in length in respect to the base with simple structure and more convenient installation.

What disclosed above are some embodiments of the disclosure, and the scope of the disclosure certainly cannot be limited by this. Therefore, any equivalent changes made according to the scope of the disclosure still belong to the disclosure.

| Reference Numeral List | |
|---|---|
| 1000: Base; | 101: Housing; |
| 100: Telescopic Adjustment structure; | 11: Fixing Part; |
| 10: Fixing Device; | 121: Positioning Part; |
| 12: Connecting Part; | 131: Guiding Hole; |
| 13: Guiding Member; | 21: Engaging Part; |
| 20: Locking Member; | 23: First Mounting part; |
| 22: Elastic Member; | 31: Driving Member; |
| 30: Driving Assembly; | 3111: Second Mounting Part; |
| 311: First Connecting Block; | 3121: First Connecting Hole; |
| 312: Second Connecting Block; | 321: Second Connecting Hole; |
| 313: Rotating Part; | 41: Limiting Hole. |
| 32: Releasing handle; | |
| 33: Mounting Member; | |
| 40: Mounting Frame; | |

What is claimed is:

1. A telescopic adjustment structure arranged on a base, comprising:
   a fixing device movably arranged on the base, comprising a plurality of positioning parts; and
   a locking member movably arranged on the base and capable of locking the fixing device,
   wherein the fixing device is locked to different corresponding positions of the base by the locking member cooperating with different positioning parts,
   wherein the fixing device is movable relative to the base by the locking member separated from the positioning parts,
   wherein the locking member comprises a mounting part, a first structure extending from the mounting part in a first horizontal direction from the mounting part configured to cooperate with the positioning parts, and a second structure extending from the mounting part in a second horizontal direction opposite the first horizontal direction,
   wherein an engaging part that is shaped as a flange extends radially outward from the second structure,
   wherein an elastic member fixed to the base extends in the first horizontal direction towards the locking member with at least a portion of the elastic member configured to be positioned around at least a portion of the second structure, and
   wherein the elastic member is configured to abut the engaging part to bias the locking member towards the positioning parts.

2. The telescopic adjustment structure according to claim 1, wherein the fixing device comprises a fixing part and a connecting part, the positioning parts is arranged on the connecting part, and a length of the fixing part protruding out of the base is adjusted by the locking member locked to different positioning parts.

3. The telescopic adjustment structure according to claim 1, wherein the positioning parts are positioning holes or positioning slots.

4. The telescopic adjustment structure according to claim 2, wherein the fixing device further includes a guiding member, the guiding member is provided with a guiding hole for the connecting part to pass through, and the connecting part slides along the guiding hole such that the fixing part is telescopically adjustable.

5. The telescopic adjustment structure according to claim 1, wherein the locking member is arranged elastically telescopic on the base.

6. The telescopic adjustment structure according to claim 5, wherein the elastic member constantly has a tendency to lock the locking member to the fixing device.

7. The telescopic adjustment structure according to claim 1, wherein the base is further provided with a mounting frame, the mounting frame is arranged on a side of the fixing device close to the locking member, a limiting hole is arranged on the mounting frame, and the locking member passes through the limiting hole to be locked or unlocked with the positioning parts.

8. The telescopic adjustment structure according to claim 1, wherein the base is further provided with a driving assembly, one end of the driving assembly is connected to the locking member, the other end of the driving assembly is arranged on the other side of the base in respect to a position where the fixing device is arranged, and the driving assembly is driven to separate the locking member from the positioning parts.

9. The telescopic adjustment structure according to claim 8, wherein the driving assembly includes an releasing handle and a rotatably driving member, the driving member is respectively connected to the locking member and the releasing handle; the releasing handle has one end connected to the driving member and the other end for a user to operate, the driving member brings the locking member to separate from the positioning parts by an operation of the other end of the releasing handle for a user to operate.

10. The telescopic adjustment structure according to claim 9, wherein the driving member includes a first connecting block and a second connecting block linked to each other, and a rotating part connecting the first connecting block and the second connecting block; an end of the first connecting block away from the rotating part is connected to the locking member, an end of the second connecting block away from the rotating part is connected to the releasing handle, the rotating part is fixed to the base via a mounting member, and the first connecting block and the second connecting block are rotatably arranged on the mounting member by the rotating part.

11. The telescopic adjustment structure according to claim 10, wherein the rotating part has a through hole for the mounting member to pass through and to be pivotally fixed to the base, the mounting member pivotally fixes the driving member on the base in a direction perpendicular to the base, and a plane where the driving member moves is substantially parallel to a plane where the base is located.

12. The telescopic adjustment structure according to claim 10, wherein the first connecting block, the second connecting block, and the rotating part are an integral structure.

13. The telescopic adjustment structure according to claim 9, wherein the driving member is an L-shaped structure.

14. The telescopic adjustment structure according to claim 10, wherein the locking member is provided with a first connecting part, the first connecting block is provided with a second connecting part cooperating with the first connecting part, and the driving member is connected to the locking member by the first connecting part and the second connecting part.

15. The telescopic adjustment structure according to claim 9, wherein the releasing handle is provided with a resetting member making the releasing handle constantly have a reset tendency.

16. The telescopic adjustment structure according to claim 15, wherein the resetting member is a spring structure.

17. A child safety carrier comprising a carrier body for carrying a child and a base connected to the carrier body, wherein the base is provided with the telescopic adjustment structure according to claim 1.

18. The telescopic adjustment structure according to claim 10, wherein the end of the first connecting block away from the rotating part is rotatably connected to the mounting part of the locking member.

* * * * *